Patented Aug. 2, 1938

2,125,377

UNITED STATES PATENT OFFICE 2,125,377

CYANIDE MANUFACTURE

Harry J. Hosking, Brooklyn, N. Y., assignor, by mesne assignments, to E. I. du Pont de Nemours and Company, a corporation of Delaware No Drawing. Application June 27, 1932, Serial No. 619,519

19 Claims. (Cl. 23—79)

This invention relates to the manufacture of alkali metal salts from the corresponding carbonates and more particularly to the manufacture of cyanides by reacting hydrocyanic acid or its equivalent with alkali metal carbonates.

A common method of manufacturing an alkali metal cyanide comprises reacting hydrocyanic acid with a solution of caustic alkali and subsequently evaporating the solution, crystallizing out the cyanide dihydrate and dehydrating the crystalline product to produce the anhydrous salt. This method is not economical because of the relatively high cost of the raw materials and because it consists of a plurality of steps which increases the cost of labor and equipment. Furthermore, during the evaporation and drying steps, a certain amount of decomposition occurs, resulting in an impure product and lowered yields.

It has been proposed to pass hydrocyanic acid through a bath of fused carbonate to produce the cyanide. This process requires a special apparatus because of the high temperatures involved and requires the application of considerable heat to keep the carbonate fused. The high temperature is further disadvantageous in that it causes a certain amount of decomposition of both the hydrocyanic acid and the cyanide, resulting in relatively low yields. For these reasons it has never been satisfactory as a commercial process.

Another proposed method, which if feasible, would overcome the disadvantages of the above described processes, comprises reacting hydrocyanic acid or formamide with solid, finely-divided, anhydrous alkali metal carbonate. A number of different methods for carrying out this reaction have been proposed, but heretofore none of these methods has been satisfactory for producing a high grade product with good yields, the chief difficulty being that the particles of carbonate tend to become coated with a layer of cyanide which inhibits further reaction.

One object of this invention is to provide a means for manufacturing an alkali metal salt by the reaction of a solid metal carbonate with an acidic gas, whereby the carbonate is substantially completely reacted. A further object is to produce a substantially pure, anhydrous alkali metal cyanide in good yield, by reacting a carbonate with gaseous hydrocyanic acid or its equivalent.

I have discovered that the above stated objects may be accomplished by reacting an acidic gas with an "active" form of the solid, anhydrous carbonate. An "active" carbonate suitable for use in my invention may be made (a) by calcining an alkali metal bicarbonate or sesquicarbonate below the temperature of incipient fusion of the material handled, or (b) by dehydration of a hydrated form of an alkali metal carbonate below its fusion temperature. Such "active" anhydrous carbonates are characterized by having an opaque, fluffy appearance when viewed under the microscope and in having a relatively low density, as contrasted with "inactive" carbonates which are more dense than the "active" forms and have a transparent or semi-transparent appearance when viewed under the microscope. As shown in the examples given below, the "active" form of carbonate is characterized by giving high yields of substantially pure salt when reacted with an acidic gas or its equivalent, while the inactive forms under similar conditions give relatively low yields and produce products contaminated with considerable quantities of unreacted carbonate.

One method of producing an "active" carbonate may be illustrated by reference to the production of "active" sodium carbonate. To produce this material, I heat sodium bicarbonate or sodium sesquicarbonate ($Na_2CO_3.NaHCO_3.2H_2O$) within the temperature range of 250–370° C. until tests show that the conversion to anhydrous carbonate is complete. During this process the temperature preferably is not allowed to rise much above 350° C. because at higher temperatures there is some tendency for an inactive form of carbonate to be produced.

"Active" anhydrous sodium carbonate may also be made by dehydrating the decahydrate at a temperature below its melting point, that is, below about 34° C. This may be done in several ways. One method comprises removing the water by means of an alcohol, for instance, methanol. This may be done by mixing the hydrated salt with anhydrous methanol below 34° C., preferably at 25–30° C., for several hours, separating the methanol, repeating this process several times and finally drying to remove the alcohol. Another method comprises passing dry nitrogen over or through a mass of crystals of the decahydrate at a temperature between 25–34° C., preferably at about 30° C., until the salt has been completely dehydrated. A third method comprises placing the decahydrate in an enclosed space under a partial vacuum, in the presence of an efficient desiccating material, for instance $P_2O_5$.

To produce alkali metal cyanide according to my invention, I contact gaseous hydrocyanic acid or its equivalent with the herein described "active" carbonate at a suitable reacting temperature below the melting point of the carbonate or the cyanide, for instance, 300–400° C. The compounds which may be used in place of hydrocyanic acid in practicing my invention are those substances which, when heated in the vapor phase, tend to decompose to form hydrocyanic acid. Such compounds, examples of which are formamide and ammonium cyanide, readily react in the vapor phase with alkaline carbonates to form the corresponding metal cyanides. I prefer to use the carbonate in a finely-divided form, for instance, around 80–200 mesh size. The reacting gas or vapor may, for instance, be passed through a mass of finely-divided carbonate or over a thin layer of the same. If passed over a layer of the carbonate, the latter may be agitated if desired. I prefer passing the vapor over a mass of finely-divided carbonate with a mild agitation. I have found that if agitation is too vigorous the material tends to cake, thus interfering with complete reaction. If such caking occurs, the material may be removed from the reaction cleaner, reground and again contacted with the reacting gas in order to get complete reaction.

It will be noted that the preferred temperature range for reacting the active carbonate with HCN, etc. is somewhat higher than the preferred temperature at which the active carbonate is prepared. I have found that although the active carbonate must be prepared below a certain limiting temperature in order to obtain the maximum of activity, nevertheless, the active carbonate may be heated to considerably higher temperatures without substantial loss of activity, provided it is not heated to its melting point. Likewise, the reaction of the active carbonate with acidic gas may be carried out at temperatures just below the melting point of either the carbonate or the resulting salt, whichever is lower.

My invention is further illustrated by the following examples:

*Example I*

Five different samples of substantially pure sodium bicarbonate were calcined at varying temperatures, ranging from 200–600° C. until the transformation to carbonate was complete. During the calcination, the water vapor formed was removed by a stream of anhydrous nitrogen which passed over the heated material. The five samples of anhydrous sodium carbonate thus produced were separately reacted with an excess of pure hydrocyanic acid vapor with mild agitation at about 350° C. for two hours. The resulting products were analyzed for their sodium cyanide content. The results obtained are shown in the following table:

| Run number | 1 | 2 | 3 | 4 | 5 |
|---|---|---|---|---|---|
| Temp. of NaHCO₃ decomposition | 200° C. | 300° C. | 350° C. | 450° C. | 600° C. |
| Density of the anhydrous carbonate | 0.625 | 0.625 | 0.625 | 0.80 | 0.935 |
| NaCN in final product | 94.7% | 97.9% | 97.1% | 80.7% | 31.7% |

The carbonate used in runs 1, 2 and 3 had a fluffy, opaque appearance under the microscope. Microscopic examination of the carbonate of run 5 showed masses of dense, transparent to semi-transparent crystals.

*Example II*

An active sodium carbonate was prepared by heating sodium sesquicarbonate $$(Na_2CO_3.NaHCO_3.2H_2O)$$

at 350° C. under a stream of anhydrous nitrogen, and grinding the resulting material to about 80 mesh size. The resulting density of the anhydrous carbonate thus produced was approximately 0.74. A quantity of this material was reacted at 350° C. with hydrocyanic vapor for two hours as in Example I. The resulting product contained 97.5% of sodium cyanide.

*Example III*

Three batches of active sodium carbonate were prepared from the decahydrate ($Na_2CO_3.10H_2O$), one by treating with methanol at 25–30° C., another by contacting with a current of anhydrous nitrogen at 25–30° C. and the third by placing in a laboratory desiccator with $P_2O_5$ under a partial vacuum at room temperature.

The dehydration with methanol was carried out as follows:

About one liter of anhydrous methanol was added to 200 grams of crystals of $Na_2CO_3.10H_2O$, the mixture was stirred for 5 hours and the alcohol then was separated by decantation. One liter of fresh alcohol was added to the salt, the mixture was stirred for 3 hours and the alcohol decanted as before. One liter of anhydrous alcohol was again added and the mixture stirred for 5 hours. After standing over night the salt was filtered from the alcohol and the remaining alcohol removed by drying at 80–100° C. for 4½ hours.

Each of the samples of active carbonate thus produced were screened to about 80 mesh size and then were reacted with hydrocyanic acid at about 350° C. as described in Examples I and II. The product obtained was analyzed for sodium cyanide with the results shown in the following table:

| Method of dehydration | NaCN in final product |
|---|---|
| | Percent |
| Methanol | 97.5 |
| Nitrogen | 98.9 |
| P₂O₅ | 98.3 |

Although I have described my invention as a method of producing sodium cyanide, it is obvious that other alkali metal cyanides or mixtures of them, may also be made by my process. However, in producing active carbonates of metals other than sodium, the dehydration or calcination temperatures will not necessarily be confined to the temperature ranges given above, since it is obvious that the conditions required to produce the best results will differ with the metal. Obviously, the proper temperature for any carbonate may be readily determined by simple experimentation. However, in each case, the active carbonate is prepared by forming the anhydrous material at temperatures below the fusion point of the raw material employed.

Furthermore, my process is not restricted to the manufacture of cyanides, but may be applied to other reactions between a solid alkali metal carbonate and an acidic gas at temperatures below the melting point whereby a solid substance results. For instance, I have found that gaseous hydrogen chloride reacts more rapidly and more completely with the active alkali metal carbonates than with the inactive forms. Obviously other acidic gases may be reacted with carbonate in accordance with my invention, for instance vapors of organic acids or gaseous anhydrides of inorganic acids. Throughout this specification and in the appended claims I have employed the term "acidic gas" to mean any gas or vapor capable of reacting with solid alkali metal carbonate to form another alkali metal salt.

*Example IV*

Anhydrous sodium carbonate of about 80 mesh-size, made by calcining sodium bicarbonate at a temperature below 370° C., having a density of 0.667 and containing 98.2% by weight of $Na_2CO_3$ was contacted with gaseous hydrogen chloride at about 200° C. for 75 minutes. Analysis of the resulting product showed that 81.4% of the sodium carbonate had been converted to chloride.

The above experiment was repeated, using 80 mesh-size "Bakers C. P." anhydrous sodium carbonate having a density of 0.87 and containing 99.% by weight of $Na_2CO_3$. Viewed under the microscope, this carbonate had a dense, transparent appearance, substantially identical with that of samples made by calcining sodium bicarbonate at 600° C. The treatment with HCl converted 13.6% of the carbonate to sodium chloride.

My invention may be carried out as a continuous process as well as in batches. For example, I have obtained excellent results by continuously introducing pulverant active sodium carbonate into the upper end of an inclined tube and causing it to flow therethrough countercurrent to a stream of HCN or HCl by means of mild agitation. With proper rates of flow, this method gives results equal to those obtained by the batch method.

My novel process for the manufacture of alkali metal cyanides has a number of advantages over the various methods heretofore proposed. It is capable of producing cyanides of high purity in good yield. It operates at comparatively low temperatures, thus avoiding decomposition of the reactants or the product, and produces a dry, pulverant product without the employment of evaporating or drying operations.

In the appended claims the term hydrocyanic acid forming compound" is used to designate hydrocyanic acid and a substance capable of being thermally decomposed in the vapor phase to produce hydrocyanic acid.

I claim:

1. A process for the production of an alkali metal salt comprising contacting an acidic gas with an active form of the corresponding carbonate in the solid state, said carbonate being made by calcining the bicarbonate at a temperature between 250 and 500° C.

2. A process for the production of an alkali metal salt comprising contacting an acidic gas with an active form of the corresponding carbonate in the solid state, said carbonate being made by dehydrating a hydrated alkali metal carbonate at a temperature below its melting point.

3. Process for the production of alkali metal cyanide comprising contacting hydrocyanic acid gas at a reacting temperature with an active form of the corresponding carbonate in the solid state, said carbonate being made by calcining the bicarbonate at a temperature below incipient fusion.

4. Process for the production of alkali metal cyanide comprising contacting hydrocyanic acid gas at a reacting temperature with an active form of the corresponding carbonate in the solid state, said carbonate being made by calcining the sesquicarbonate at a temperature below incipient fusion.

5. Process for the production of alkali metal cyanide comprising contacting hydrocyanic acid gas at a reacting temperature with an active form of the corresponding carbonate in the solid state, said carbonate being made by dehydrating a corresponding hydrated carbonate at a temperature below its melting point.

6. Process for the production of a sodium cyanide containing more than 97% sodium cyanide comprising contacting hydrocyanic acid gas at 300–450° C. with an active carbonate in the solid state, said carbonate being made by calcining the bicarbonate at a temperature below incipient fusion.

7. Process for the production of a sodium cyanide containing more than 97% sodium cyanide comprising contacting hydrocyanic acid gas at 300–450° C. with an active carbonate in the solid state, said carbonate being made by calcining sodium bicarbonate at 250–370° C.

8. Process for the production of a sodium cyanide containing more than 97% sodium cyanide comprising contacting formamide at 300–450° C. with an active carbonate in the solid state, said carbonate being made by calcining the sodium bicarbonate at 250–370° C.

9. Process for the production of a sodium cyanide containing more than 97% sodium cyanide comprising contacting hydrocyanic acid gas at 300–450° C. with an active carbonate in the solid state, said carbonate being made by calcining sodium sesquicarbonate at a temperature below incipient fusion.

10. Process for the production of a sodium cyanide containing more than 97% sodium cyanide comprising contacting hydrocyanic acid gas at 300–450° C. with an active carbonate in the solid state, said carbonate being made by dehydrating hydrated sodium carbonate at a temperature below its melting point.

11. Process for the production of a sodium cyanide containing more than 97% sodium cyanide comprising contacting hydrocyanic acid gas at 300–450° C. with an active carbonate in the solid state, said carbonate being made by dehydrating sodium carbonate decahydrate at 25–34° C.

12. Process for the production of a sodium cyanide containing more than 97% sodium cyanide comprising contacting formamide at 300–450° C. with an active form of the corresponding carbonate in the solid state, said carbonate being made by dehydrating sodium carbonate decahydrate at 25–34° C.

13. A process of obtaining sodium cyanide comprising heating sodium bicarbonate to a temperature between 250° and 500° C. to produce sodium carbonate and then reacting the sodium carbonate produced with hydrocyanic acid gas.

14. A process of obtaining sodium cyanide comprising heating sodium bicarbonate to a temperature of about 360° C. to form sodium carbonate and then reacting said sodium carbonate with hydrocyanic acid gas.

15. Process for the production of alkali metal cyanide comprising contacting the vapor of a hydrocyanic acid forming compound at a reacting temperature with an active form of the corresponding carbonate in the solid state, said carbonate being made by calcining the bicarbonate at a temperature below incipient fusion.

16. Process for the production of alkali metal cyanide comprising contacting the vapor of a hydrocyanic acid forming compound at a reacting temperature with an active form of the corresponding carbonate in the solid state, said carbonate being made by calcining the sesquicarbonate at a temperature below incipient fusion.

17. Process for the production of alkali metal cyanide comprising contacting the vapor of a hydrocyanic acid forming compound at a reacting temperature with an active form of the corresponding carbonate in the solid state, said carbonate being made by dehydrating a hydrated carbonate at a temperature below its melting point.

18. A process for the production of alkali metal cyanides which comprises contacting the vapor of a hydrocyanic acid forming compound at a temperature of 300–450° C. with an active form of the corresponding carbonate in the solid state which has been rendered active by heat treatment.

19. A process for the production of sodium cyanide which comprises contacting the vapor of a hydrocyanic acid forming compound at a temperature of 300–450° C. with an active form of the corresponding carbonate in the solid state, said carbonate having been rendered active by heat treatment.

HARRY J. HOSKING.